United States Patent [19]

Charlot et al.

[11] Patent Number: 5,541,744
[45] Date of Patent: Jul. 30, 1996

[54] HOLOGRAPHIC PROCESS AND DEVICE USING INCOHERENT LIGHT

[75] Inventors: Didier Charlot, Paris; Yann Malet, Saint Cyr l'Ecole, both of France

[73] Assignee: Le Conoscope SA, Paris, France

[21] Appl. No.: 244,249

[22] PCT Filed: Nov. 25, 1992

[86] PCT No.: PCT/FR92/01095

§ 371 Date: Oct. 6, 1994

§ 102(e) Date: Oct. 6, 1994

[87] PCT Pub. No.: WO93/11445

PCT Pub. Date: Jun. 10, 1993

[30] Foreign Application Priority Data

Nov. 27, 1991 [FR] France .................................. 91 14661

[51] Int. Cl.⁶ .............................. G03H 1/06; G03H 1/26; G02B 27/28
[52] U.S. Cl. .............................. 359/11; 359/30; 359/494; 359/497
[58] Field of Search .............................. 359/11, 30, 494, 359/497

[56] References Cited

U.S. PATENT DOCUMENTS

| | | | |
|---|---|---|---|
| 4,602,844 | 7/1986 | Sirat et al. | 359/30 |
| 4,976,504 | 12/1990 | Sirat et al. | 359/30 |
| 5,081,540 | 1/1992 | Dufresne et al. | 359/30 |
| 5,081,541 | 1/1992 | Sirat et al. | 359/30 |
| 5,216,527 | 6/1993 | Sharnoff et al. | 359/30 |
| 5,223,966 | 6/1993 | Tomita et al. | 359/11 |
| 5,291,314 | 3/1994 | Agranat et al. | 359/11 |

*Primary Examiner*—Martin Lerner
*Attorney, Agent, or Firm*—Peter L. Michaelson; John C. Pokotylo

[57] ABSTRACT

The present invention concerns a holographic process including a stage consisting in producing the hologram of a point P thank to an optical device including a crystal (131) and two polarizers (132,135) placed respectively before and after the crystal (131), characterized by the fact that it includes in addition the stages consisting in: 1) separating the answers of the optical system corresponding to two different polarizations and 2) combining both these answers in order to obtain a signal which depends only on the distance between the point P ant the optical device. The invention concerns also a device which allows the implementation or this process.

4 Claims, 6 Drawing Sheets

HOLOGRAPHIC PROCESS AND DEVICE USING INCOHERENT LIGHT

BACKGROUND OF THE INVENTION

The present invention describes an improved holographic process and a device using incoherent light.

The principle of incoherent holography and its application to distance measurements have been described in U.S. Pat. No. 4,602,844. This patent describes an optical system (named "Conoscopic Apparatus") including a birefringent uniaxial crystal and two polarizers which permit the hologram of a point in incoherent light to be optically formed.

If a ray of light impinges on the crystal, the birefringent properties of the crystal causes the incident light to be split into two light beams having perpendicular polarizations. The first light beam (ordinary ray) propagates inside the crystal at a velocity Vo (index of refraction No) independent of the propagation direction. The second light beam (extraordinary ray) propagates inside the crystal at a velocity Ve (index of refraction Ne) which is a function of the propagation direction.

At the first order of approximation on the incidence angle, the two light beams follow the same geometrical path in the crystal. However, because the two light beams do not propagate at the same velocity, they are out of phase with each other at the exit face of the crystal.

The polarizer placed after the crystal will permit the ordinary and extraordinary vibrations to recombine such that the phase of the resulting wave is coded in the form of an interference Figure.

The polarizer placed before the crystal permits two rays of the same intensity to be obtained such that a maximum contrast is obtained at the output.

For a small incident angle $\theta$, and with a crystal of length L, whose crystallographic optical axis is parallel to the optical axis of the system, the phase difference between the ordinary and extraordinary rays induced by passing through the crystal is:

$$\Delta\phi = \frac{\pi}{\lambda} \theta^2 Z_0^2 \left( \frac{1}{Z_E} - \frac{1}{Z_O} \right) \quad (1)$$

where $$Z_O = Z - L + (L/no) \quad (2)$$

$$Z_E = Z - L + (Lno/ne^2) \quad (3)$$

The amplitude of the wave in the observation plane is the sum of the ordinary and extraordinary amplitudes. The intensity recorded at a point Q (x, y, o) is proportional to:

$$H_1(Q) = I(P).(1 + \cos \Delta\phi) \quad (4a)$$

or $$H_2(Q) = I(P).(1 - \cos \Delta\phi) \quad (4b)$$

depending on whether the two polarizers have the same handiness or not.

In these relationships, I(P) is the intensity of the wave coming from the object point P (xO,yO,z), onto the detector, i.e., this one which should be recorded without the conoscopic part.

The interference pattern obtained which represents the conoscopic hologram of a point is called Gabor zone lens.

Indeed, the conoscopic hologram of a point recorded at the wavelength $\lambda$ is similar to the hologram of the same point recorded with coherent light (Gabor holography) at an equivalent wavelength $\lambda eq$ given by:

$$\lambda eq = \sqrt{Z_O Z_E} \quad \lambda/(Z_O - Z_E)$$

The French Patent Publication No. FR-A-2641091 describes some improvements to the system described in U.S. Pat. No. 4,602,844. Still other improvements are described in the French Patent Publication Nos. FR-A-2646251 and FR-A-2646252.

Until now, to recover the shape of the object, it was proposed to record the holograms on a CCD array or linear CCD array, to then digitize the obtained signal, and to numerically process the digitized signal. The numerical data process consists mainly of a Fourier transform.

The systems described in the above mentioned documents have a great interest. However, the known systems which include numerical data processing have a limited measurement time because of the time consumed by the numerical data processing. In addition the quantity of light needed to achieve a given signal to noise ratio (on which depends the further precision) is proportional to the square root of the number of detectors.

The object of present invention is to improve the existing devices and to suppress their disadvantages.

SUMMARY OF THE INVENTION

The present invention obtains the above mentioned objects by providing a process including steps of:

creating a point hologram by means of an optical device including a crystal and 2 polarizers positioned upstream and downstream the crystal;

separately recording the system outputs corresponding to two different polarizations; and combining these two recordings to give a signal which is function of the distance between the point and the optical system.

In a preferred embodiment of the present invention, the combination of the two recordings of the device is based on the ratio between a difference and a sum of the recordings.

The present invention also concerns a device to implement the above described process.

BRIEF DESCRIPTION OF THE DRAWINGS

Others characteristics, goals and advantages of the present invention will be clarified in the detailed description of the annexed Figures, given for non limitative examples.

DETAILED DESCRIPTION

FIRST EXAMPLE

Figure 1:
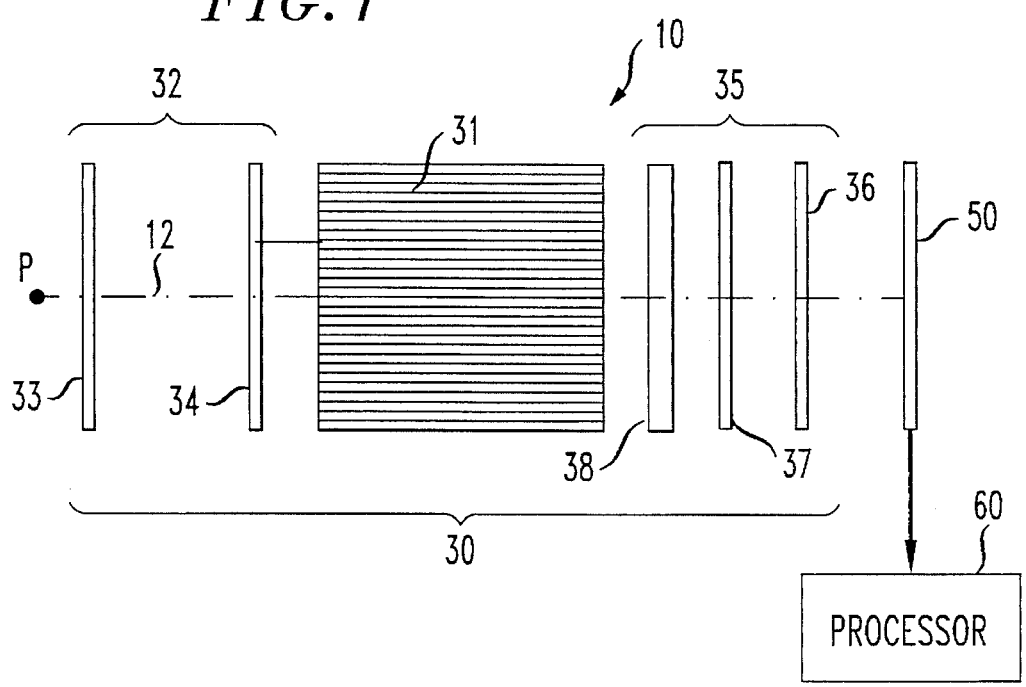
FIG. 1 is a schematic which represents the structure of a first device in accordance with present invention.

A first example of the present invention is described referring to FIG. 1.

The optical axis of device 10 is referenced as 12. The device 10 contains:
- a conoscopic system 30 including:
  - a birefringent crystal 31, and
  - 2 polarizers, 32 and 35 placed upstream and downstream from the crystal 31, respectively, and along the axis of the device 10;
- a photodetector 50 positioned downstream from polarizer 35; and
- a processor 60 coupled with the photodetector 50.

The first polarizer 32 is a circular polarizer which includes a linear polarizer 33 and a quarter wave plate 34 positioned behind the linear polarizer 33. The second polarizer 35 is a circular polarizer which includes a linear polarizer 36, a quarter wave plate 37 positioned ahead the linear polarizer 36, and an electro-optic valve 38 positioned ahead the quarter waveplate 37. The electro-optic valve 38 is utilized to rotate the polarization by 90° such that when the valve 38 voltage changes, the polarizer 35 functions as a right polarizer or a left polarizer. Thus, the electro-optic valve 38 allows the expression terms $H_1(Q)$ and $H_2(Q)$, given by the relations (4a) and (4b), to be obtained successively on the photodetector 50. These two values are processed in the processor 60.

More precisely the photodetector 50 is a circular photodetector centered on axis 12. The photodetector 50 integrates the recorded light (a Gabor zone). The photodetector 50 may be a photodiode for example.

EXPERIMENTAL RESULTS

The expression terms given by the equations (4a) and (4b) are invariant for a translation of an observed point P, in a perpendicular plane of the optical axis 12 of the device 10. Indeed, if the object point P is translated in this plane, the corresponding Gabor zone center will be translated by the same quantity.

Figure 2:
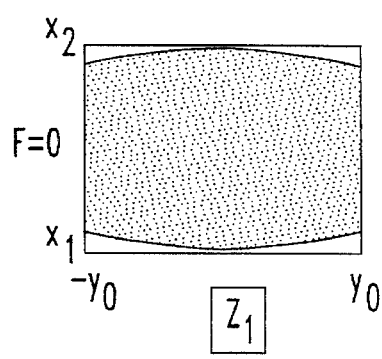
FIGS. 2 to 6 represent interference patterns recorded by a detector.
Figure 3:
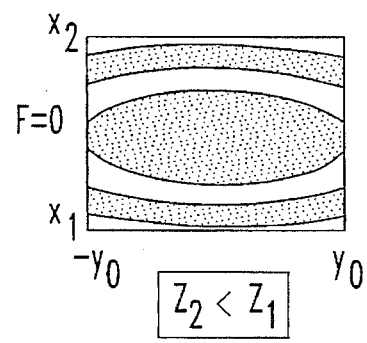
Figure 4:
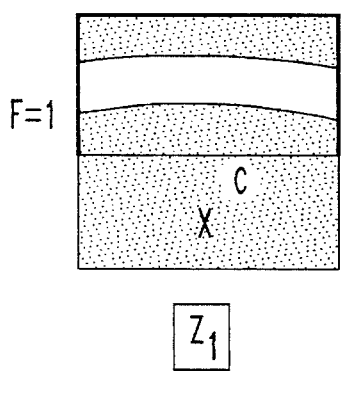
Figure 5:
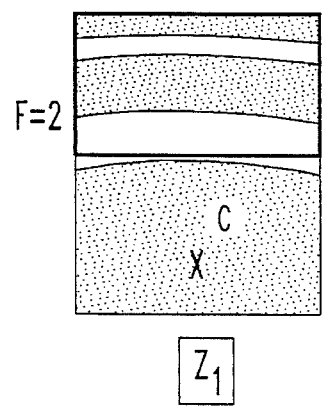
Figure 6:
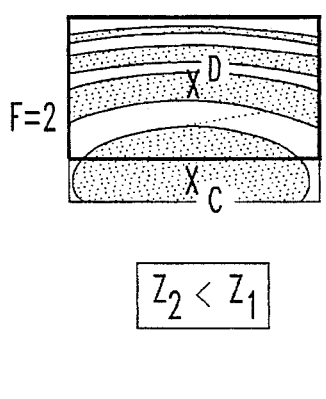

FIGS. 2 to 6 represent schematically the interference patterns detected by a rectangular photodetector 50. In FIGS. 2 to 6, the F parameter represents the number of the black or white fringe on which the photodetector 50 is centered. FIG. 2 represents the interference pattern for a photodetector 50 centered on the black central fringe (F=O) at a distance Z1. FIG. 3 represents the interference pattern for a photodetector 50 centered on the black central fringe (F=O) at a smaller distance Z2<Z1. FIG. 4 represents the interference pattern for a photodetector 50 centered on the first white fringe (F=1) at the distance Z1. FIG. 5 represents the interference pattern for a photodetector 50 centered on the second black fringe (F=2) at the distance Z1 between the analyzed point and photodetector 50. FIG. 6 represents the interference pattern for a photodetector 50 centered on the second black fringe (F=2) at the smaller distance Z2<Z1.

A comparison of the results of FIGS. 2 and 3 on one hand, and FIGS. 5 and 6 on the other hand, show that when Z varies, the same fringe remains centered on detector. Consequently, for F=O, the zone center C moves.

Moreover, a comparison of the results of the FIGS. 2, 4, and 5 show that, when F increases and Z is fixed, the center position of the Gabor zone moves away from the center of the detector 50.

The representations given on FIGS. 2 to 6 correspond to one of the two used polarizations. The interference patterns recorded with the second polarization are complementary with those illustrated on FIGS. 2 to 6.

GENERAL INFORMATION ABOUT PROCESSING

Figure 7:
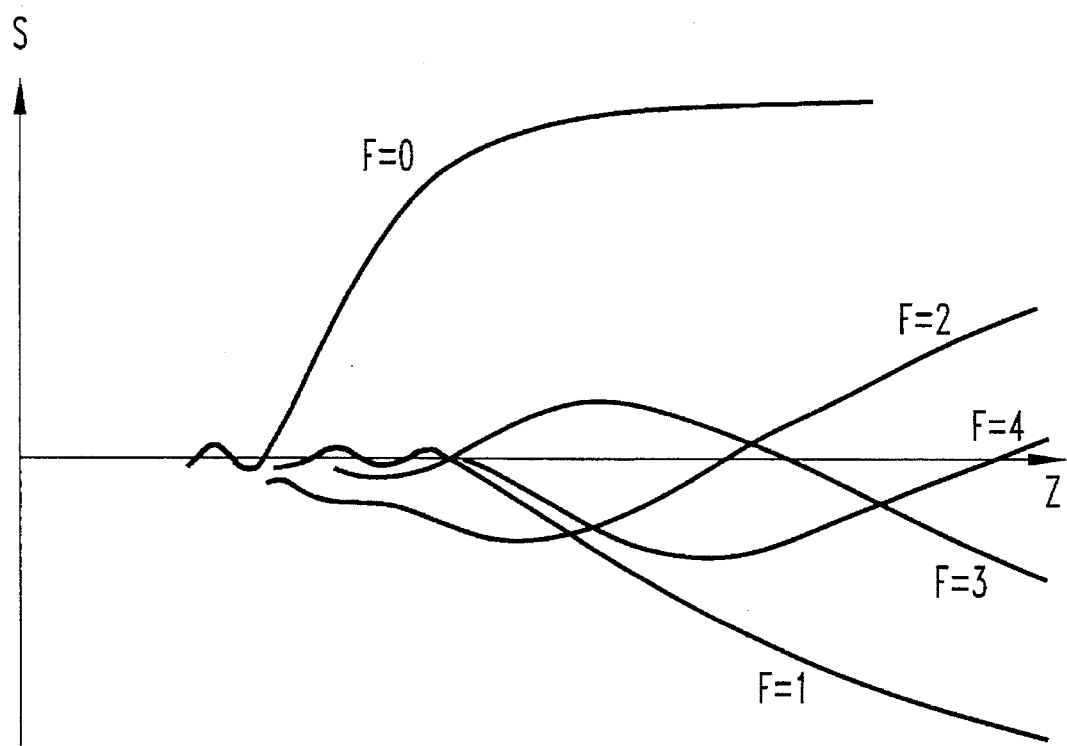
FIG. 7 represents signal output curves given after processing the signals recorded by detectors.

FIG. 7 represents the relationship of the ratio between the difference and sum of the values (S) successively obtained by photodetector 50 by the valve action 38 based on the distance Z for respective F values of 0, 1, 2, 3, 4. The calculated S value eliminates sensitivity to the ambient light.

The represented curves on FIG. 7 show that configurations having the steepest slope are those for F=O. That is, the configurations in which the optical axis 12 of the device 10 on which the photodetector 50 is centered, have a coincidence with optical axis of the crystal.

PROCESSING IN THE CASE OF A DETECTOR CENTERED ON THE CRYSTAL AXIS

The optical signals recorded successively by the photodetector 50 and given by the relations (4a) and (4b) can be written as:

$$H1\ (x,y) = I\ (x,y)\ (1 + \cos \alpha((x^2 + y^2)))\quad (6a)$$

$$H2\ (x,y) = I\ (x,y)\ (1 - \cos \alpha(x^2 + y^2))\quad (6b)$$

The conoscopic parameter is related to the distance Z between the observed point and photodetector 50 through the expression:

$$= \frac{\pi L \Delta n}{\lambda Z_o Z_e}$$

Where
- α=Crystal Length
- =Light wavelength
- $Z_O = Z - L + L/n_o$
- $Z_e = Z - L + L n_o/n_e^2$
- $n_o$=ordinary indices of refraction of the Crystal
- $n_e$=extraordinary indices of refraction of the Crystal
- $\Delta n = n_o^2 - n_e^2/(n_o\ n_e^2)$ The photodetector 50 integrates the received light energy. Thus, the signals output by the photodetector 50 are given by:

$$S_1 = \iint H_1(x,y)dxdy \quad (8a)$$

$$S_2 = \iint H_2(x,y)dxdy \quad (8b)$$

Following a preferred embodiment of the device of the present invention, the processor 60 calculates the ratio between difference and sum of the values of the integrated received light energy based on the following equation:

$$S = \frac{S_1 - S_2}{S_1 + S_2} \quad (9)$$

If the lighting is homogeneous, i.e. if I (x,y) is constant, the S value obtained is a sine function expressed as:

$$S = \frac{\sin(\alpha R^2)}{\alpha R^3} \quad (10)$$

Where R represents the detection pupil radius (i.e., either the photodetector 50 radius, or either an upstream mounted mask or diaphragm radius).

This signal S is not related with the intensity I, but rather, is function of the distance Z between the observed point and the photodetector 50.

Figure 8:
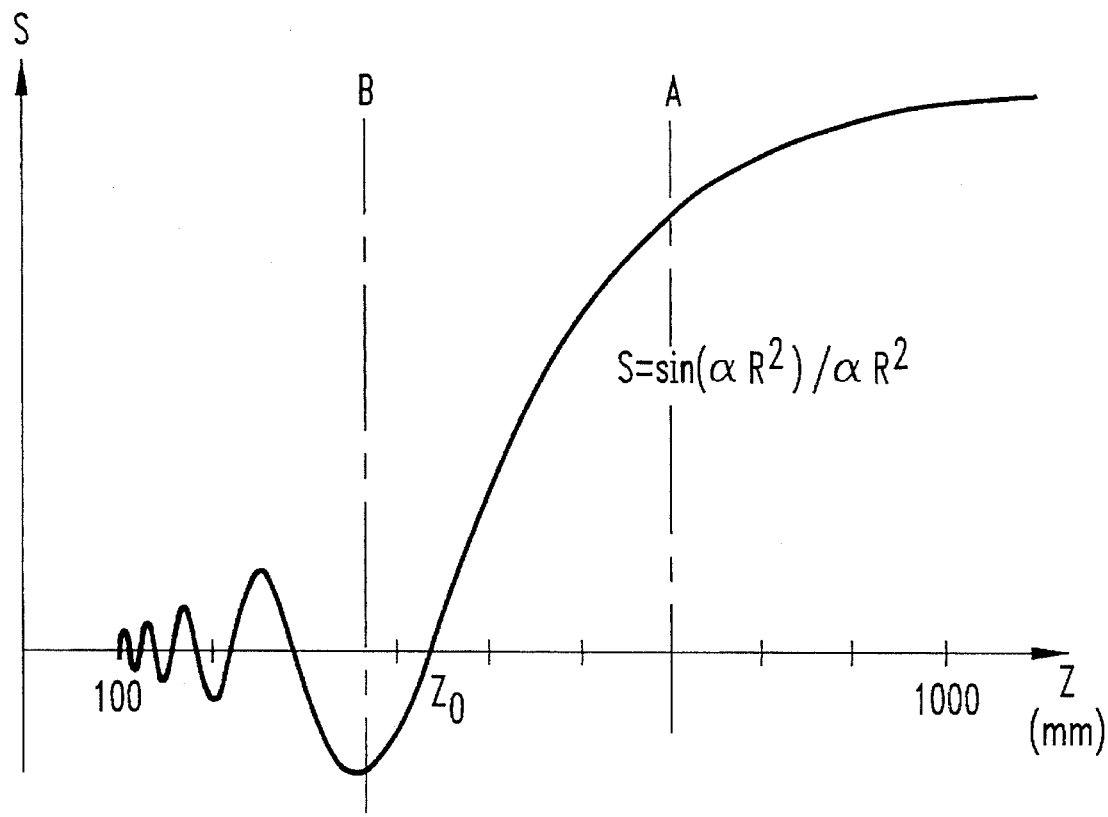
FIG. 8 represents a preferential output curve.

FIG. 8 represents the variation of S as function of Z in experimental conditions characterized by:

Wavelength λ=632.8 nm

Crystal 31=calcite
length=25 mm
ordinary index (no)=1,658
extraordinary index (ne)=1,486

Detector 60 radius R=5.65 mm

The slope of the S curve is maximum between the two abscissas A and B. The value of Z can be unequivocally determined based on S between these two points.

In the experimental example presented, the measurement field between the two points A and B is taken between 700 mm (for A) and 380 mm (for B).

These limits of depth of field correspond to a translation zone taken between point B at which the detector 50 detects 1.3 fringes, and point A in which the detector 50 detects 0.3 fringe. Whatever the characteristics of the crystal 31 are, this zone, taken between 0.3 fringe and 1.3 fringe on the photodetector 50, can be used to get the maximum sensitivity in detecting the distance Z. This exploitation mode, in which a variation of a single fringe is detected, will be called monofringe. This exploitation mode presents a limited depth of field. However, the depth of field may be widened without changing the maximal sensitivity between F=0.3 and F=1.3, by using a multifringes device, that is, by using a device in which several fringes are present on the same detector.

VARIANT MODES WITH INCREASED DEPTH OF FIELD

Figure 9:
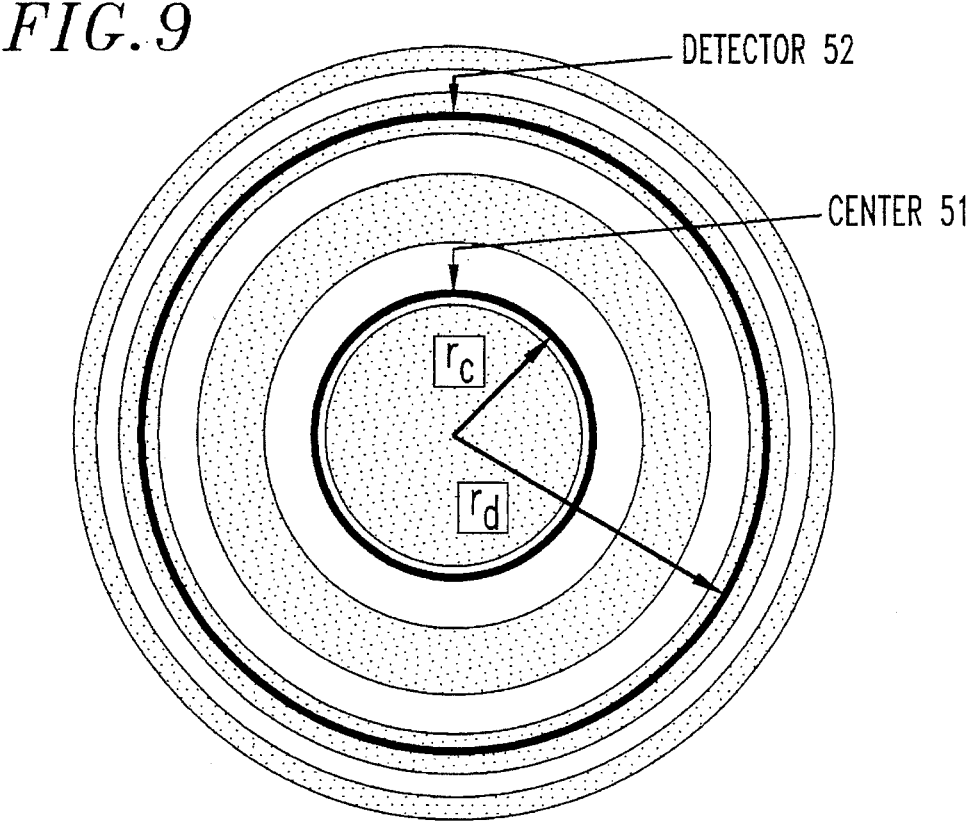
FIG. 9 represents an alternative embodiment of a detection device in accordance with the present invention.

FIG. 9 depicts an alternative embodiment of the device of the present invention which increases the depth of field by dividing the photodetector 50 into one circular central part 51 and one external ring 52 which surrounds the central part 51. The central part 51 behaves as a fringes counter. The central part 51 and external part 52 make a single detector by summing their outputs.

Figure 10:
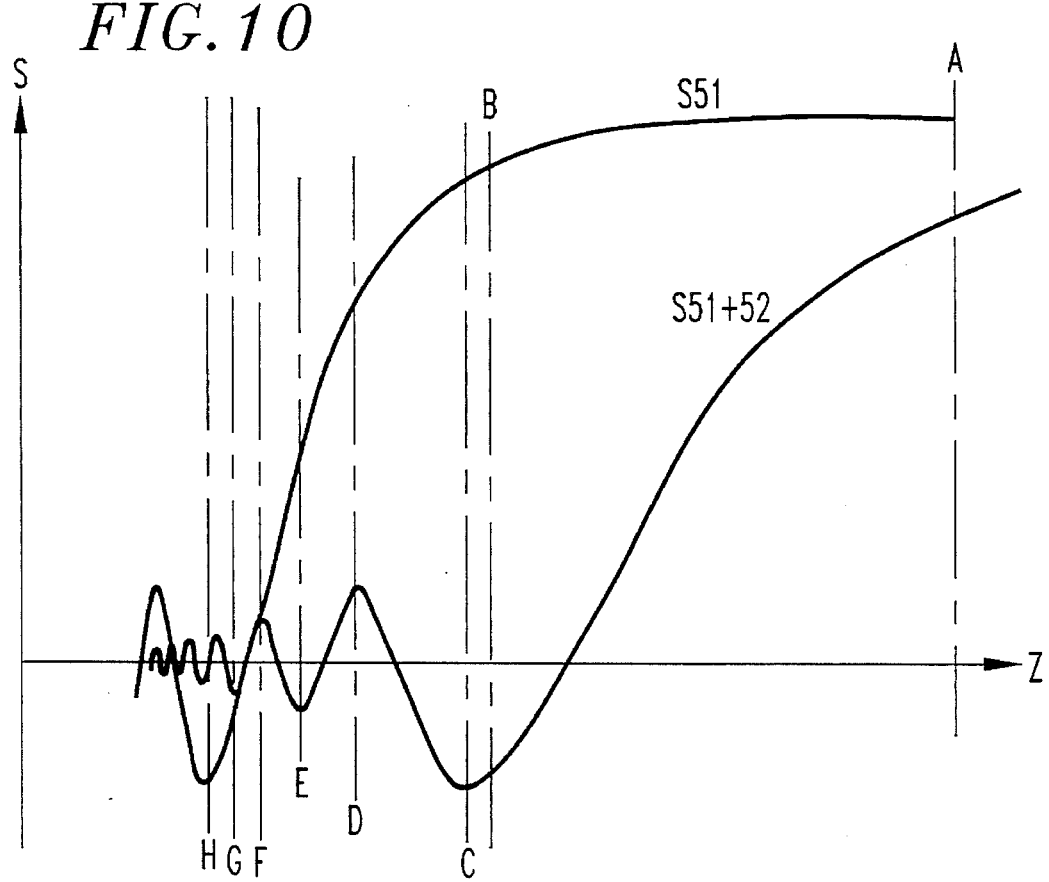
FIG. 10 represents some curves obtained with the detection device of FIG. 9.

FIG. 10 illustrates the relationship of the ratio between the difference and the sum of the signals provided by the fringes counter 51 (S51 with respect to the distance Z and the relationship of the ratio between the difference and the sum of the sums provided by the fringes counter 51 and the external part 52 (S51+52) with respect to the distance Z for both polarizations as they are driven by the light valve 38.

The shape of the curve S51+52 changes its sign for half-integer values of the number fl of fringes which were observed by the detectors 51+52.

In FIG. 10, the points of the curve S51+52 for which: fl=0.3; fl=1.5; fl=2.5; fl=3.5; fl=4.5; fl=5.5; and fl=6.5 are marked by the letters: A, C, D, E, F, G and H, respectively, and are indicated by a dashed line. This curve corresponds to curve S of FIG. 8.

One skilled in the art will understand that some combinations including S51 and S51+52 allow detection in a bi-unequivocal manner and with precision, of the distance, z, in the depth of field A to H and not only on the depth of field A to B. For instance, the curve S51 produced by the counter 51 allows the segment AB, BC, CD . . . in which the measurement is present to be determined, while the curve S51+52 allows a precise positioning, z, inside each of these segments. To obtain an optimal detection, the radius, $r_c$ of the counter 51 is calculated to cover the range of 0.3 to 1.3 fringes observed while the detector 51+52 covers the range of 1.5 to 6.5 observed fringes. If, for example, the calculation is made for a radius, $r_d$, of the external part S2 of the detector equal to $r_d$=5 mm, then the counter radius will be $r_c$=2.2 mm.

The photodetector 50 must be adapted to have low losses between the central part 51 and the ring 52 which surrounds the central part 51.

Alternative solution using two photodetectors

Figure 11:
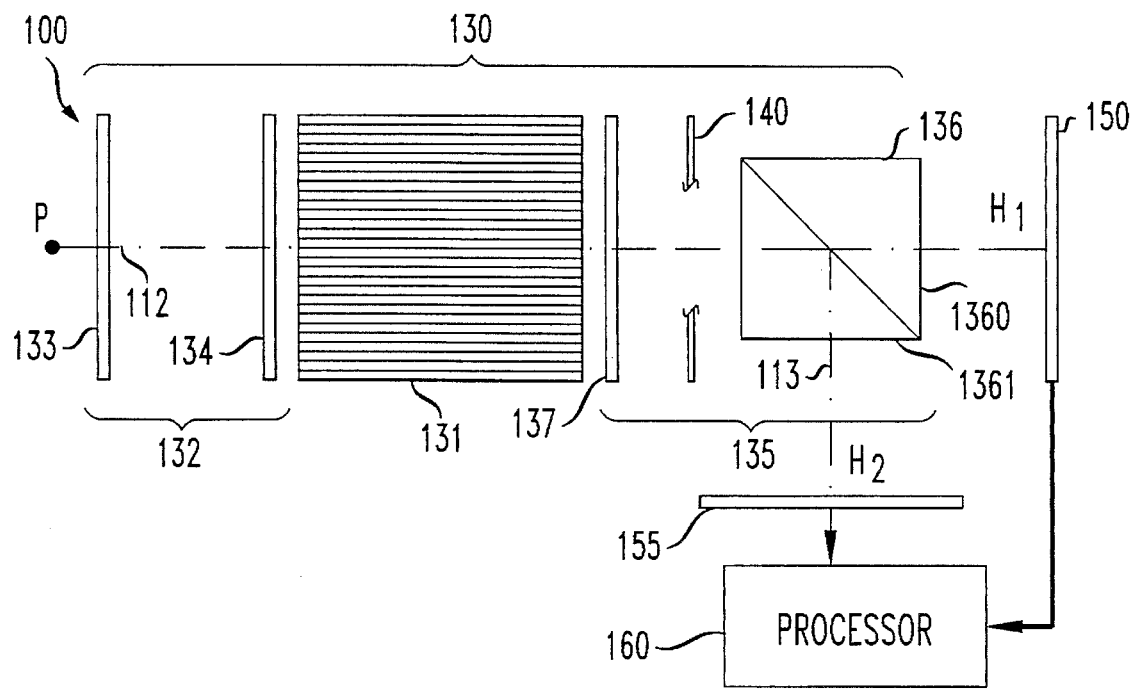
FIGS. 11, 12 and 13 represent alternative devices in accordance with the present invention.

FIG. 11 presents an alternative embodiment of the present invention using two photodetectors 150 and 155.

The optical axis of the device 100 is referenced as 112. The device 100 includes:

a conoscopic system 130 including:

a birefringent crystal 131; and two polarizers 132 and 135 located in front of and behind the crystal 131, respectively, along the axis 112 of the device 100;

a limited aperture 140;

two photodetectors 150 and 155; and a signal processor 160 coupled with the photodetectors 150 and 155.

In the same manner as the first embodiment of the present invention shown on the FIG. 1, the first polarizer 132 is a circular polarizer which includes a linear polarizer 133 and a quarter-wave plate 134 located after the linear polarizer 133. The second polarizer 135 includes a polarizing beamsplitter cube 136 and a quarter-wave plate 137 located in front of the cube 136.

The polarizing beamsplitter cube 136 ensures the correct combination of the ordinary and extraordinary modes (light beams) as well as a polarization splitting.

The limited aperture 140 is located between the quarter wave plate 137 and the cube 136 of the second polarizer 135.

Both photodetectors 150 and 155 are located, respectively, facing both end faces 1360 and 1361 of the cube 136. The photodetector 150 is centered on the optical axis 112 behind the cube 136 and its sensitive surface is perpendicular to the optical axis 112. The photodetector 155 is centered on the axis 113 which is perpendicular to the optical axis 112. Its sensitive surface is perpendicular to the axis 113.

Both photodetectors 150 and 155 allow the values S1 and S2 corresponding to the integration of the luminous power, which exits the crystal 131 and following two perpendicular polarizations which were split by the cube 136 parallel to the plane of FIG. 11 for the detector 150 and perpendicularly to the plane of FIG. 11 for the detector 155, to be acquired simultaneously.

In a preferred embodiment of the present invention, both photodetectors 150 and 155 have the same sensitive surface with a circular shape.

The processor 160 coupled with the photodetectors 150 and 155 calculates the signal S as given by the relationship (9) (i.e., the ratio between the difference and the sum of the signals provided by both photodetectors 150 and 155). The curve describing the relationship of S with respect to Z is similar to the curve shown in FIG. 8. Accordingly, the device 100 has a preferred depth of field within 0.3 to 1.3 fringes on the photodetectors 150 and 155 to obtain a maximum sensitivity. However, to increase the depth of field, similar to FIG. 9, as shown in FIG. 12, each photodetector 150 or 155 can be divided into one central circular part 1500 or 1550, respectively, and an external annular part 1501 or 1551, respectively which surrounds the central parts 1500 or 1550, respectively.

The central parts 1500 and 1550 of the photodetectors 150 and 155, respectively, are the so-called counters of fringes. Central parts 1500 and 1550 and external annular parts 1501 and 1551 of the photodetectors 150 and 155, respectively, generate the signals S1500 and S1550, respectively. The sum of both parts 1500 and 1501 of the photodetector 150 generates the signal S1550+1551. The relationship of the ratio (S1500−S1550)/(S1500+S1550) between the difference of the signals provided by the central parts 1500 and 1550 of the photodetectors 150 and 155, respectively, and the sum of the same signal with respect to Z is illustrated by the curve S51 as shown on FIG. 10. The relationship of the ratio (S1500+1501−S1550+1551)/(S1500+1501+S1550+1551) with respect to Z is illustrated by the curve S51+52 as shown on FIG. 10.

Figure 12:
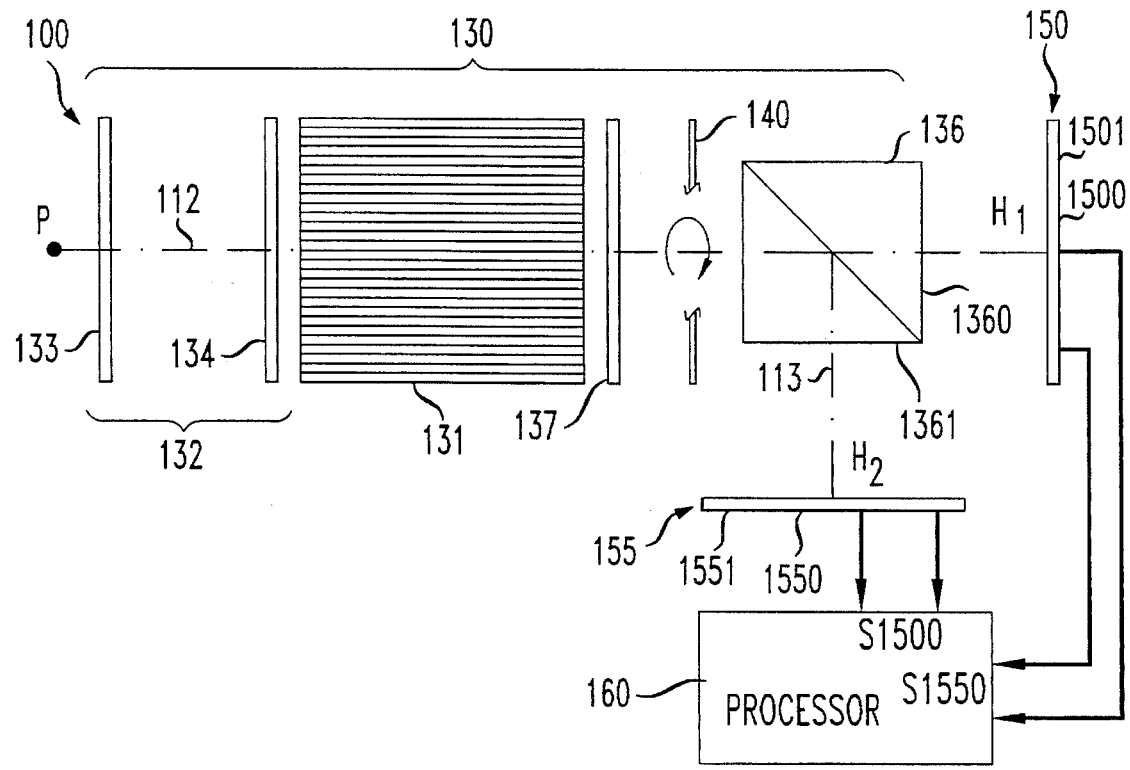

The embodiments of the present invention shown in FIGS. 11 and 12 are free from any time variations of the luminous power emitted by the source point because each of the signals are sampled at the same time and not sequentially as was the case with the embodiment of the present invention shown in FIG. 1. In the case of the device represented on FIG. 1, the insensitivity to the luminous power emitted by the source point obtained by dividing (H1−H2) by (Hi+H2) assumes that the measurement of H1 and H2 are realized with the same source intensity.

Otherwise, the devices shown in FIGS. 11 and 12 are faster than the device of FIG. 1 because they do not need a light valve switching to obtain the signals H1 and H2, and they provide a better signal to noise ratio.

Nevertheless as the signals H1 and H2 are detected in two different geometries, it must be ensured that those geometries are equivalent, (i.e. that photodetectors 150 and are correctly aligned to their respective axis 112 and 113).

The limited aperture 140 assures that this condition is met. Specifically, the limited aperture 140 is chosen so that for every one of the observed points P, the interference pattern does not cover the full sensitive surface of both photodetectors 150 and 155.

Alternative multifringes solution using two crystals

Figure 13:
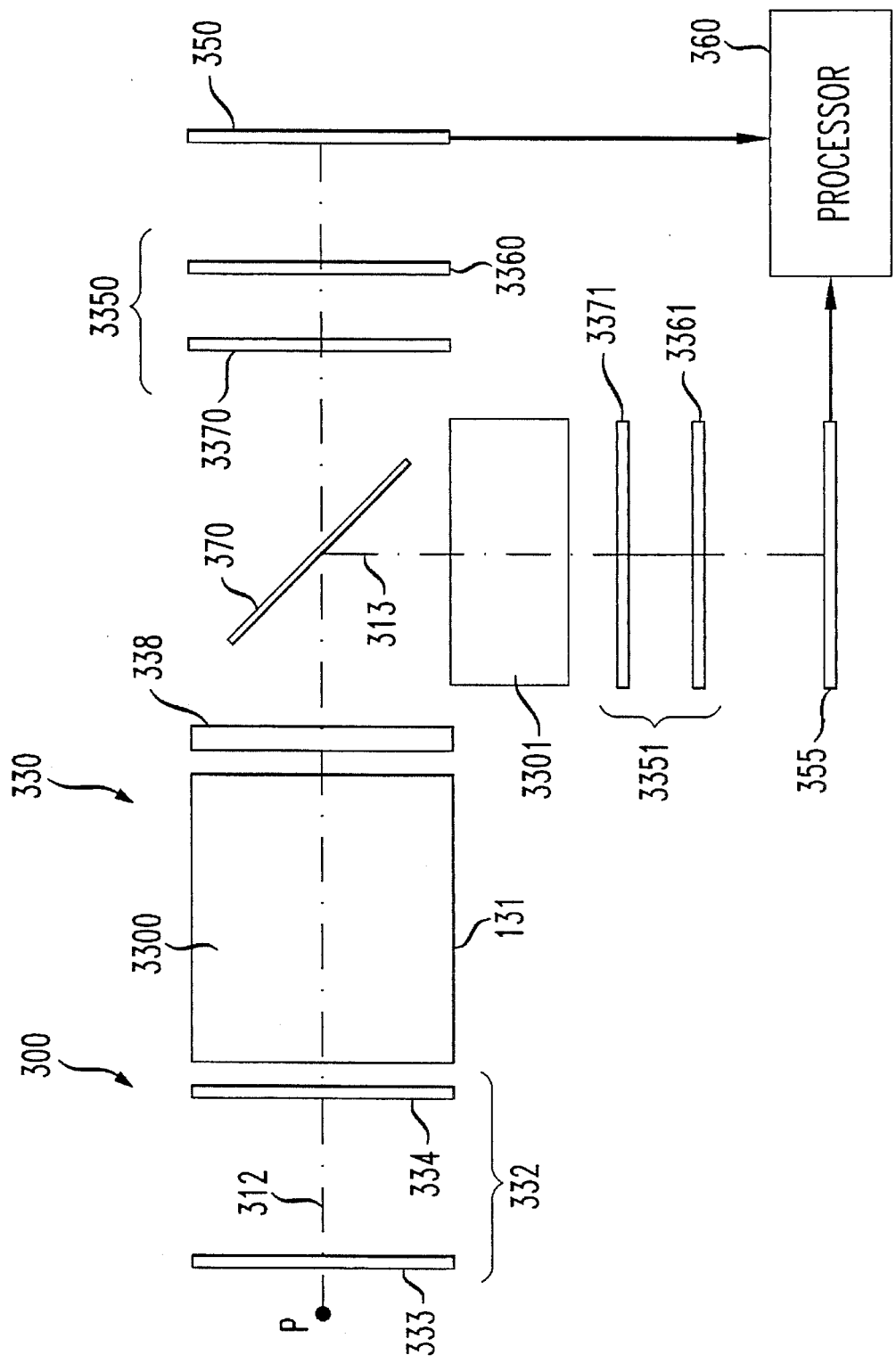

FIG. 13 is a block diagram of an alternative embodiment 300 of the device of the present invention.

The axis of the optical device 300, as shown in FIG. 13, is referenced as 312. This device 300 includes:

a conoscopic system 330 including:

a principal birefringent crystal 3300, a secondary birefringent crystal 3301, an input polarizer 332, two output polarizer assemblies 3350, 3351, a half reflection mirror 370, two photodetectors 350, 355 and a processor 360 for processing the signals generated by both photodetectors 350, 355.

The input polarizer 332 is located upstream of the principle birefringent crystal 3300 along the optical axis 312. The input polarizer 332 is a circular polarizer and includes a linear polarizer 333 and a quarter wave plate 334 placed behind the linear polarizer 333.

A light valve 338, similar to the light valve 38 as indicated above, is arranged downstream from the principle birefringent crystal 3300 along the optical axis 312. The optical light valve 338 is used to rotate the polarization by a 90° angle.

Along the optical axis 312, the light valve 338 is followed by the half reflecting mirror 370 oriented at 45° with the optical axis 312.

The first output polarizer assembly 3350 is located behind the half reflecting mirror 370 on the optical axis 312. The first output polarizer assembly 3350 includes a linear polarizer 3360 and a quarter-wave plate 3370 placed before the linear polarizer 3360. The first photodetector 350 is located after the first output polarizer assembly 3350.

The secondary crystal 3301 is located at 90° from the optical axis 312 at a 45° angle from the face of the mirror 370 and along the secondary axis 313.

The secondary crystal 3301 is followed by the second output polarizer assembly 3351. The second output polarizer assembly includes a linear polarizer 3361 and a quarter-wave plate 3371 placed in front of the linear polarizer 3361.

The second photodetector 355 is located behind the second output polarizer assembly 3351.

By driving the light valve 338, the signals S1 and S2 may be successively obtained on the photodetectors 350 and 355.

The ratio between the difference and the sum of the signals so obtained at the output of the first photodetector 350 allows a curve corresponding to the curve S51 as shown on the FIG. 10 to be obtained. The first photodetector 350 thus has the role of the so-called fringes counter 51 represented on FIG. 9.

Otherwise, the ratio between the difference and the sum of the obtained signals at the output of the second photodetector 355 allows a curve corresponding to the curve S51+52 as shown on FIG. 10 to be obtained. The second photodetector 355 thus has the role of the so-called detector 51+52 represented on FIG. 9.

In a similar manner as the device of the embodiment of the present invention shown in FIG. 9, the embodiment of the device of the present invention shown in FIG. 13 allows the depth of field to be improved over the one obtained by the embodiment of the device of the present invention shown in FIG. 1.

In an alternative embodiment of the present invention, the secondary crystal 3301 could be placed before the first photodetector 350 instead of the second photodetector 355.

Intensity mask

In the multifringes responses obtained through the devices described in FIGS. 1 or 11, it is possible to decorrelate the measured distance and the depth of field by arranging an intensity mask before the detector(s) 50 or 150 and 155.

The intensity mask can be placed at any position on the optical path between the observed point P and the detector(s) 50 or 150 and 155.

The intensity mask is, however, preferably placed between the conoscopic system 30 or 130 and the photodetector(s) 50 or 150 and 155.

In the case of the device of FIG. 11, either a single intensity mask can be arranged before the beamsplitter 136 or two intensity masks can be arranged after the beamsplitter 136 before each one of the detector(s) 150 and 155.

This intensity mask is complementary of the interference pattern obtained on the photodetectors for a predetermined "stand-off" distance (m.e., the mean distance of the needed depth of field).

Figure 14:
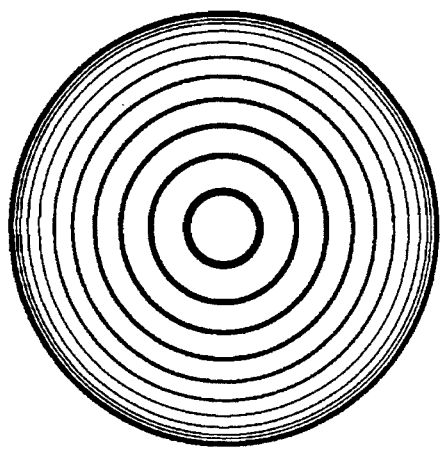
FIG. 14 represents an intensity mask which may be used in the present invention.

An example of the intensity mask 200 is represented in FIG. 14.

One skilled in the art will understand that the intensity mask will permit the system to be arranged in a configuration equivalent to a monofringe configuration, thereby permitting analysis of the response in vicinity of a chosen fringe, n.

In instances where a light source cannot be used, the system can use the light emitted by the point P due to ambient light if this light is strong enough. This light source is not represented on the Figures to simplify the drawing. The light source(s) must be spatially incoherent or made incoherent, for example by modulation, and quasi monochromatic.

In the configuration described earlier in which the system is working around one fringe, the influence of the wavelength is much less than in the classical numerical processing by Fourier transform where a large number of fringes is recorded. Indeed, in polychromatic light, each spectral component produces it's own fringe pattern with the scale being different. The superposition of these patterns causes a contrast loss and this loss is higher if the fringe number is higher. More accurately:

$$\frac{\Delta F}{F} = \frac{\Delta \lambda}{\lambda}$$

for example for $$\frac{\Delta \lambda}{\lambda} = 10\%$$

and for F=1, we obtain ΔF=0.1 which corresponds to a contrast loss of 2% approximately; for F=50 we obtain ΔF=5 which corresponds to a contrast loss of 96%.

Autofocus system

An autofocus system, based on this invention, will be described with reference to FIG. 15.

In the curve S presented in FIG. 8, a special position of distance exists for which the signal S is 0. Before and after this position (Zo), the signal S is respectively negative and positive. This specific position (Zo) can be used as a reference which can be used by an autofocus function.

In this type of application, the distance between the object and the device is not measured but rather, a reference position which corresponds to the position for which the signal S is 0 is determined.

Figure 15:
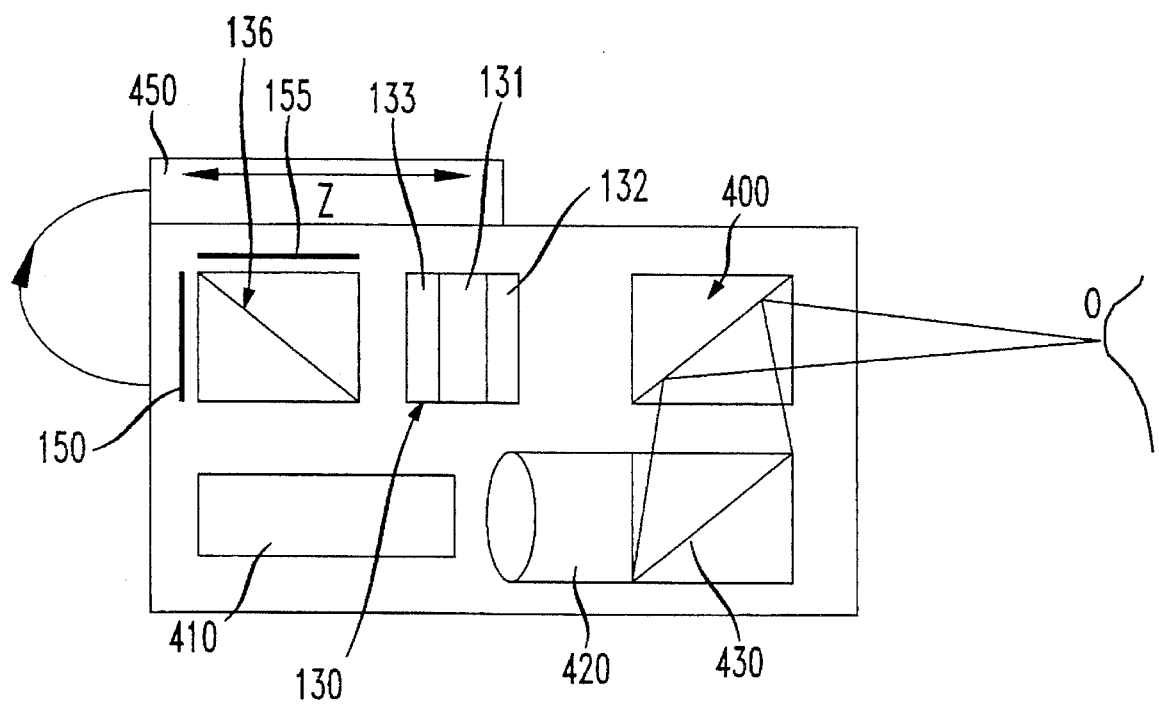
FIG. 15 represents a device having autofocus properties in accordance with the present invention.

In FIG. 15, a conoscopic device 130, including a birefringent crystal 131 which is placed between two polarizers 132 and 133, and a polarizing beamsplitter plate 136 can send the response corresponding to the two polarizations toward the detectors 150 and 155.

Also, in FIG. 15, a beamsplitter 400 is placed before the conoscopic device 130, (i.e., between it and the object O to be observed). This beamsplitter 400 permits the object O to be observed with the conoscopic device 130 and to be illuminated with the source 410. The source 410 can be either a LED or laser diode or another similar means. The light emitted by source 410 is focused by the optic 420 and deflected toward the beamsplitter plate 400 by a mirror 430.

The optical head is coupled to an automatic system 450 of mechanical displacement in the longitudinal direction (i.e., along the device axis). The value of the output voltage of the optical head controls its displacement such that the proper focusing position is maintained.

In conclusion, the devices based on the present invention described above measure the quantity of light impinging on each detector and by combining the signal obtained, discards the mean intensity to obtain a signal having a value which depends, for a given range, in a bi-unequivocal way, on the distances between the observed point and the sensor.

Of course the described invention is not limited to the specific embodiments described above but extends to any alternative embodiments in accordance with the spirit of the present invention.

As mentioned before, the crystal (31, 131, or 3300) may have its optical axis either parallel to the optical axis of the system (12, 112, or 312) or tilted relative to this optical axis.

The intensity mask 200 as represented schematically in FIG. 14 can be used either to precisely define the geometry of the detector (square, rectangle, round . . . ) or to permit the non uniformity of the transfer function of the detectors to be corrected.

An imaging optic can be provided before the input polarizer. This imaging optic can be of the spherical type. In this case, the point P to be observed must be precisely positioned on the optical axis of the system. Alternatively, the imaging optics can be of the cylindrical type. In this case, straight and parallel fringes are produced. Further, in this case, the constraints of positioning of point P to be observed are less stringent because the point P can move on a straight line perpendicular to the optical axis of the system and parallel to the generators of the cylindrical optics (i.e., in the symmetry plane of the cylindrical optics).

The processor 60, 160, or 360 is preferably implemented using pure analogic electronics but can be also implemented with digital electronics.

The input polarizer 32, 132, or 332 and the output polarizer 135, 3350, or 3351 described above may be of the circular type.

Linear polarizers can also be used. It is also possible to use any of the configurations:

Linear input and circular output;

Circular input and circular output;

Circular input and linear output; and

Linear input and linear output;

Following the previous description, the processor 60, 160, or 360 calculates $S=(S_1-S_2)/(S_1+S_2)$. Following a first variation, the processor 60, 160, or 360 can calculate $S_1/S_2$. Following a second variant, the processor 60, 160, or 360 can control the value $S_1+S_2$ (i.e., the total quantity of light) by modifying the integration time and will calculate $S_1-S_2$, when $S_1+S_2$ has reached the needed value.

The value 38 or 338 can be a liquid crystal light valve, a PLZT device, a Pokes cell or any equivalent device.

Since the device of the present invention works by integrating the received light flux, focusing optics can be arranged before each detector 50, 150, 155, 350, or 355. This disposition will allow the use of smaller size photodetectors which are generally faster than larger size photodetectors.

The systems previously described analyze a single point. To analyze a 3D object, a scanning unit may be used with those systems.

Such a scanning unit can be any known structure. For example a rotating mirror, a hologram, an accousto-optic device or any similar means as described in the document "Elements of modern Optical Design" Donald C. O'Shea - Wiley interscience are convenient.

Such a scanning unit will allow the profile (2D) or the shape (3D) of an object to be recorded.

We claim:

1. In a device having a first polarizer, a second polarizer having two distinct polarization angles, and a birefringent crystal located between the first and second polarizers, a process including steps of: producing two distinct holograms of a point P, located at a distance from the device, the two distinct holograms corresponding to the two distinct polarization angles of the second polarizer, using the device;

separately integrating amounts of light producing each of the two distinct holograms to produce two signals corresponding to the two distinct polarization angles of the second polarizer; and combining the two signals to obtain a resulting signal which depends only on the distance z between the point P and the device.

2. The method of claim 1 wherein the step of combining the two signals includes sub-steps of:

i) determining a difference between the two signals;

ii) determining a sum of the two signals; and iii) determining a ratio between the difference and the sum.

3. The process of claim 1 wherein the step of combining the two signals includes a sub-step of determining a ratio between the two signals.

4. The process of claim 1 wherein the step of combining the two signals includes sub-steps of:

i) repeatedly summing the two signals to form a plurality of sums; and ii) determining a difference between the two signals when one of the plurality of sums reaches a predetermined value.

* * * * *